US012187340B2

(12) United States Patent
Kimura et al.

(10) Patent No.: US 12,187,340 B2
(45) Date of Patent: Jan. 7, 2025

(54) SUPPORT BEAM

(71) Applicant: NIPPON STEEL CORPORATION, Tokyo (JP)

(72) Inventors: Yukihiko Kimura, Tokyo (JP); Kunihiro Yabuno, Tokyo (JP); Keigo Minatani, Tokyo (JP); Sam Soo Hwang, Tokyo (JP); Kenji Tamura, Tokyo (JP); Hiroshi Nogami, Tokyo (JP); Koichiro Ishihara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 526 days.

(21) Appl. No.: 17/279,788

(22) PCT Filed: Sep. 24, 2019

(86) PCT No.: PCT/JP2019/037324
§ 371 (c)(1),
(2) Date: Mar. 25, 2021

(87) PCT Pub. No.: WO2020/071179
PCT Pub. Date: Apr. 9, 2020

(65) Prior Publication Data
US 2021/0331744 A1    Oct. 28, 2021

(30) Foreign Application Priority Data

Oct. 2, 2018  (JP) ................................. 2018-187647

(51) Int. Cl.
*B62D 21/11*    (2006.01)

(52) U.S. Cl.
CPC .................................... *B62D 21/11* (2013.01)

(58) Field of Classification Search
CPC ................... B62D 21/11; E04B 1/5812; E04C 2003/0452; B60G 2206/121; B60G 2206/30; B60G 2206/31; B21K 1/12; B60B 35/003
See application file for complete search history.

(56) References Cited

U.S. PATENT DOCUMENTS 8,984,843 B2 *  3/2015  Tak .......................... E04H 7/065
                                                              52/837
11,420,472 B2 *  8/2022  Tamura ..................... B21J 5/022
(Continued)

FOREIGN PATENT DOCUMENTS

EP    2161146 A1    3/2010
JP    03071907 A    7/1991
(Continued)

*Primary Examiner* — Andrew J Triggs
(74) *Attorney, Agent, or Firm* — GREER BURNS & CRAIN, LTD.

(57) ABSTRACT

A support beam includes a first supporting portion, a second supporting portion, and an arm connecting the first supporting portion to the second supporting portion. The arm includes a web and a flange. The flange includes a first end, a second end, and a center portion. The center portion of the flange is connected to an end of the web. The flange includes bent portions at which the center line of the thickness of the flange is bent outward in the extending direction of the web in the region between the first end and the second end in a transverse cross section of the arm.

7 Claims, 8 Drawing Sheets

(56) References Cited

U.S. PATENT DOCUMENTS

| | | | | |
|---|---|---|---|---|
| 2008/0245025 A1* | 10/2008 | Slater | ............... | E04C 3/32 |
| | | | | 52/696 |
| 2020/0023427 A1* | 1/2020 | Tamura | ............... | B60G 9/04 |
| 2021/0331744 A1* | 10/2021 | Kimura | ............... | B62D 21/11 |

FOREIGN PATENT DOCUMENTS

| | | |
|---|---|---|
| JP | 03078614 A | 8/1991 |
| JP | 09099720 A | 4/1997 |
| JP | 11314511 A | 11/1999 |

\* cited by examiner

SUPPORT BEAM

This is a National Phase Application filed under 35 U.S.C. § 371, of International Application No. PCT/JP2019/037324, filed Sep. 24, 2019, the contents of which are incorporated by reference.

TECHNICAL FIELD

The present invention relates to a support beam provided in a vehicle, such as a truck, a bus, and a car.

BACKGROUND ART

In a vehicle, a support beam is an important undercarriage component that connects a vehicle body to an axle. The support beam is arranged in the vicinity of rear wheels of the vehicle, and supports the vehicle body. Specifically, as disclosed in, for example, Patent Literature 1 (Japanese Patent Application Publication No. 11-314511), Patent Literature 2 (Japanese Utility Model Laid-Open No. 3-71907), Patent Literature 3 (Japanese Utility Model Laid-Open No. 3-78614), and Patent Literature 4 (Japanese Patent Application Publication No. 9-99720), the support beam includes a first supporting portion, a second supporting portion, and an arm. The arm connects the first supporting portion to the second supporting portion.

An axle cover supporting the axle is fixed on the first supporting portion. Air springs attached to the vehicle body are fixed on the second supporting portions. Usually, the numbers of the second supporting portions and the arms are two. The two second supporting portions are arranged in the front and back direction of the vehicle (hereinafter also referred to as "the vehicle length direction"), so as to arrange the first supporting portion between each other. In connection with this, each of the two arms extends in the vehicle length direction from the first supporting portion.

In a vehicle, in order to stabilize the riding comfort, to suppress vibration to the loaded luggage, and to make the vehicle height constant when the vehicle is loaded and unloaded, a plurality of air springs are provided in a vehicle body at intervals from each other. The support beam is used as an undercarriage component for connecting the vehicle body to the axle via the air springs.

The load in the up-and-down direction of the vehicle (hereinafter also referred to as "the vehicle height direction") is always applied on the support beam. Further, the load in the vehicle length direction may be loaded on the support beam, or the load in the width direction of the vehicle (hereinafter also referred to as "the vehicle width direction") may be applied. Therefore, the bending load in the vehicle height direction is always applied to the arms of the support beam. Further, the bending load in the vehicle width direction may also be applied to the arms.

In this manner, a large bending load is applied to the support beam. Therefore, from the viewpoint of running stability, and the viewpoint of durability to fatigue, it is required to suppress the deformation of the support beam. As one of the measures to suppress the deformation of the support beam, it is conceivable to increase the rigidity (especially, the rigidity of the arms in the vehicle height direction) of the support beam.

When the rigidity per mass of the support beam can be increased, a lighter support beam and a compacter support beam can be realized. The weight reduction of the support beam is beneficial for improving the fuel consumption. Additionally, the vehicle body, the axle, wheels, and the other components are densely packed around the support beam. Making the support beam compact is beneficial for preventing the support beam from interfering with these periphery components.

However, in Patent Literatures 1 to 4, no attention has been paid to increasing the rigidity of the support beam.

CITATION LIST

Patent Literature

Patent Literature 1: Japanese Patent Application Publication No. 11-314511
Patent Literature 2: Japanese Utility Model Laid-Open No. 3-71907
Patent Literature 3: Japanese Utility Model Laid-Open No. 3-78614
Patent Literature 4: Japanese Patent Application Publication No. 9-99720

SUMMARY OF INVENTION

Technical Problem

An object of the present invention is to provide a support beam with a high rigidity per mass.

Solution to Problem

A support beam according to an embodiment of the present invention includes a first supporting portion, a second supporting portion, and an arm connecting the first supporting portion to the second supporting portion. The arm includes a web and a flange. The flange includes a first end, a second end, and a center portion. The center portion of the flange is connected to an end of the web. The flange includes a bent portion at which the center line of the thickness of the flange is bent outward in the extending direction of the web in the region between the first end and the second end in a transverse cross section of the arm.

Advantageous Effects of Invention

With the support beam according to the embodiment of the present invention, it becomes possible to increase the rigidity per mass.

DESCRIPTION OF EMBODIMENTS

Hereinafter, an embodiment of the present invention will be described. Note that, although the embodiment of the present invention will be described with examples in the following description, the present invention is not limited to the examples described below. Although a specific numerical value and a specific material may be exemplified in the following description, the present invention is not limited to these exemplifications.

A support beam of the present embodiment includes a first supporting portion, a second supporting portion, and an arm that connects the first supporting portion to the second supporting portion. The arm includes a web and a flange. The flange includes a first end, a second end, and a center portion. The center portion of the flange is connected to an end of the web. The flange includes bent portions at which the center line of the thickness of the flange is bent outward in the extending direction of the web in the region between the first end and the second end in a transverse cross section of the arm (a first configuration). Hereinafter, the arm of the support beam of the present embodiment may be called an arm (O).

In this specification, when referring to the direction of the support beam and the members (examples: the arm, the web, and the flange) constituting the support beam, unless otherwise stated, it means the direction in a state where the support beam is mounted in a vehicle and arranged in the direction at the time of use. For example, the up-and-down direction of the vehicle, i.e., the vehicle height direction, corresponds to the up-and-down direction of the arm of the support beam. The front and back direction of the vehicle, i.e., the vehicle length direction, corresponds to the longitudinal direction of the arm of the support beam. The web extends in the vehicle height direction in a transverse cross section of the arm. In short, the extending direction of the web coincides with the vehicle height direction. In a transverse cross section of the arm, the flange extends in the left and right direction of the vehicle, i.e., the vehicle width direction. In short, the extending direction of the flange coincides with the vehicle width direction.

In the support beam of the present embodiment, an axle cover supporting an axle is fixed on the first supporting portion. An air spring attached to the vehicle body is fixed on the second supporting portion. Since the flange includes the bent portion in the arm (O), a material is arranged in a position that is distant from both the central axis of bending in the extending direction of the web (the vehicle height direction), and the central axis of bending in the extending direction of the flange (the vehicle width direction). The former central axis of the bending in the vehicle height direction corresponds to a straight line perpendicular to the center line of the thickness of the web in a transverse cross section of the arm. The latter central axis of the bending in the vehicle width direction corresponds to the center line of the thickness of the flange in the transverse cross section of the arm. Therefore, the area moment of inertia in the transverse cross section of the arm (O) is increased both in the vehicle height direction and the vehicle width direction. With this, the rigidity of the arm (O) is increased both in the vehicle height direction and the vehicle width direction. Moreover, as the result, the weight reduction can be realized. Further, the external shape dimensions of the transverse cross section of the arm (O) can be made compact.

In a typical example, in the transverse cross section of the arm (O), a flange is provided for each of two ends of the web. However, a flange may be provided for only either one of the two ends of the web. From a viewpoint of increasing the rigidity of the arm (O), it is preferable that a flange is provided for each of the two ends of the web. In short, it is preferable that the number of flanges is two.

One bent portion may be provided for one flange, two bent portions may be provided for one flange, or three or more bent portions may be provided for one flange. In a typical example, in one flange, a bent portion is provided for each of the region between the first end and the center portion, and the region between the second end and the center portion. In this case, it is preferable that the transverse cross-sectional shape of the flange provided with the bent portion is symmetrical about the center line of the thickness of the web. Additionally, when a flange is provided for each of the two ends of the web, a bent portion may be provided for only one of the two flanges, or may be provided in both of two flanges. From a viewpoint of increasing the rigidity of the arm (O), it is preferable that a bent portion is provided for both of the two flanges.

In a typical example, the numbers of the second supporting portions and the arms (O) are two. The two second supporting portions are arranged in the vehicle length direction (the front and back direction of the vehicle), so as to arrange the first supporting portion between each other. Each of the two arms (O) extends in the vehicle length direction from the first supporting portion. In short, the longitudinal direction of the arm (O) is along the vehicle length direction. In another viewpoint, one arm (O) of the two arms (O) extends forward from the first supporting portion, and the other arm (O) extends backward from the first supporting portion. However, each of the two arms (O) may not precisely extend in the vehicle length direction from the first supporting portion. In short, the longitudinal direction of the arm (O) may be generally along the vehicle length direction. Additionally, the longitudinal directions of the two arms (O) may not coincide with each other. The numbers of the second supporting portions and the arms (O) may be one, or three or more.

In a typical example, the transverse cross-sectional shape (the sizes such as an external shape, and a plate thickness) of the arm (O) is constant in the longitudinal direction of the arm (O). However, the transverse cross-sectional shape of the arm (O) may be changed in the longitudinal direction of the arm (O). For example, the closer to the first supporting portion used as a fixed point, the greater the bending moment that acts on the arm (O). Therefore, it is preferable for the transverse cross-sectional shape of the arm (O) to be larger in the vicinity of the first supporting portion compared to that in the vicinity of the second supporting portion. In this case, in order to prevent stress concentration, it is preferable that the change in the transverse cross-sectional shape of the arm (O) in the longitudinal direction is gradual.

In a typical example, the arm (O) curves along the longitudinal direction of the arm (O) as in a curved beam. However, the arm (O) may be straight as in a straight beam. Generally, a curved beam has a higher rigidity than a straight beam. From a viewpoint of increasing the rigidity, the arm (O) that is curved so as to be convex downward in the vehicle height direction is preferable.

In addition, an arm (O) may be provided with a mounting seat, such as a vibration damping damper.

In the support beam of the first configuration, it is preferable for the flange to further include a first thin-wall portion (a second configuration). In addition to this second configuration, it is preferable for the flange to further include a second thin-wall portion (a third configuration).

Here, in the transverse cross section of the arm, the first thin-wall portion and the bent portion are arranged in a first central region located on a web side in the region between the first end and the center portion. The first central region is in the range of 50% of the distance from the center line of the thickness of a web to the first end. The thickness of the first thin-wall portion is smaller than the maximum thickness of the region located outside of the first central region.

In the transverse cross section of the arm, the second thin-wall portion and the bent portion are arranged in a second central region located on the web side in a region between the second end and the center portion. The second central region is in the range of 50% of the distance from the center line of the thickness of the web to the second end. The thickness of the second thin-wall portion is smaller than the maximum thickness of the region located outside of the second central region.

In the cases of the second and third configurations, the thin-wall portion is arranged in the position on a center portion side (the web side) of the flange. In other words, a thick-wall portion is arranged in the position on an end side of the flange. In short, the thick-wall portion is arranged in the position distant from the central axis of the bending in the extending direction (vehicle width direction) of the flange. Therefore, the area moment of inertia in the vehicle width direction is further increased, and accordingly, the rigidity in the vehicle width direction is further increased.

In the case of the support beam of the second configuration, in a typical example, in the flange, an outer surface in the extending direction of the web (the vehicle height direction) of the surfaces of the region between the first end and the center portion is inclined toward the outer side in the extending direction of the web, and thereafter inclined toward the inner side in the extending direction of the web (a fourth configuration) as farther away from the web. Additionally, in the case of the support beam of the third configuration, in a typical example, in the flange, an outer surface in the extending direction of the web (the vehicle height direction) of the surfaces of the region between the second end and the center portion is inclined toward the outer side in the extending direction of the web, and thereafter inclined toward the inner side in the extending direction of the web (a fifth configuration) as farther away from the web.

In the case of the support beam of the first configuration, for example, a bent portion is provided in the region between the first end and the center portion. In a typical example in this case, in the flange, an outer surface in the extending direction of the web (the vehicle height direction) of the surfaces of the region between the first end and the center portion is inclined toward the inner side in the extending direction of the web, and thereafter inclined toward the outer side in the extending direction of the web (a sixth configuration) as farther away from the web.

In addition to the sixth configuration, the bent portion may further be provided in the region between the second end and the center portion. In a typical example in this case, in the flange, an outer surface in the extending direction of the web (the vehicle height direction) of the surfaces of the region between the second end and the center portion is inclined toward the inner side in the extending direction of the web, and thereafter inclined toward the outer side in the extending direction of the web (a seventh configuration) as farther away from the web.

Hereinafter, referring to the drawings, a description will be given of the circumstances where the support beam of the present embodiment has been devised, and the details of the support beam of the present embodiment.

[Basic Design]

Figure 1:
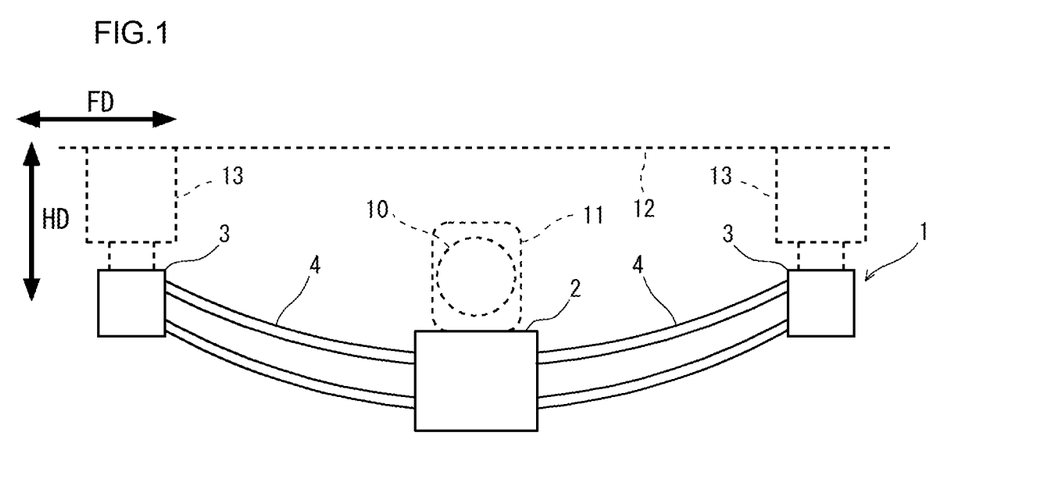
FIG. 1 is a side view schematically showing an example of a support beam.
Figure 2:
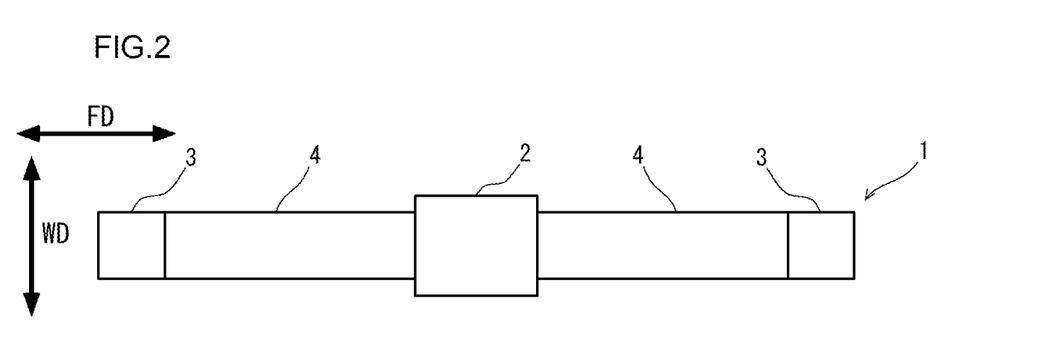
FIG. 2 is a plan view schematically showing the example of the support beam.
Figure 3A:
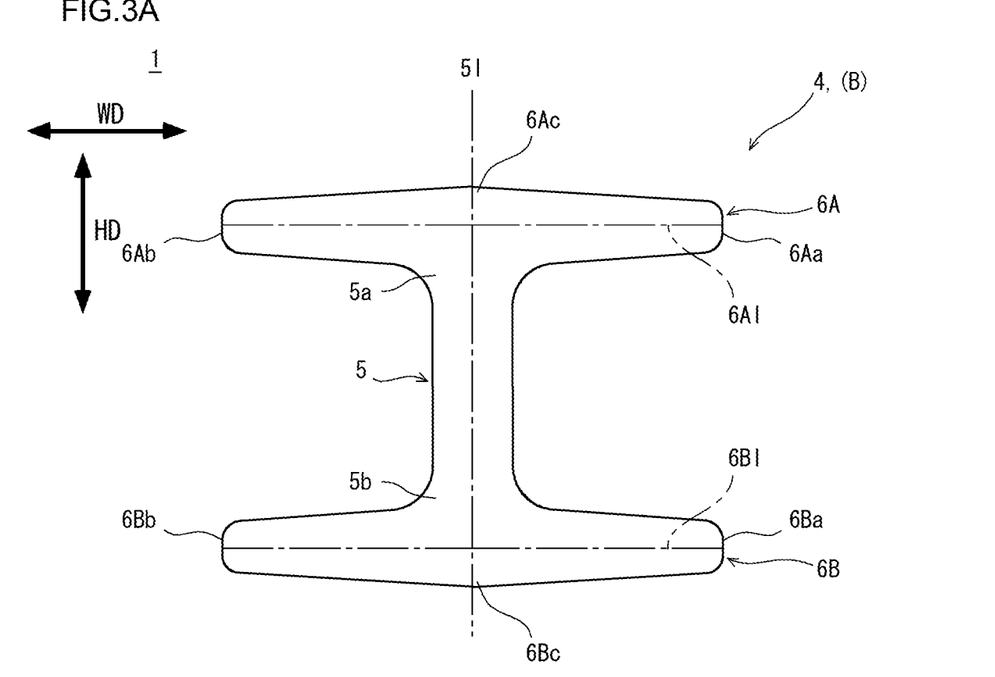
FIG. 3A is a transverse cross-sectional view schematically showing an example of the shape of an actual arm.
Figure 3B:
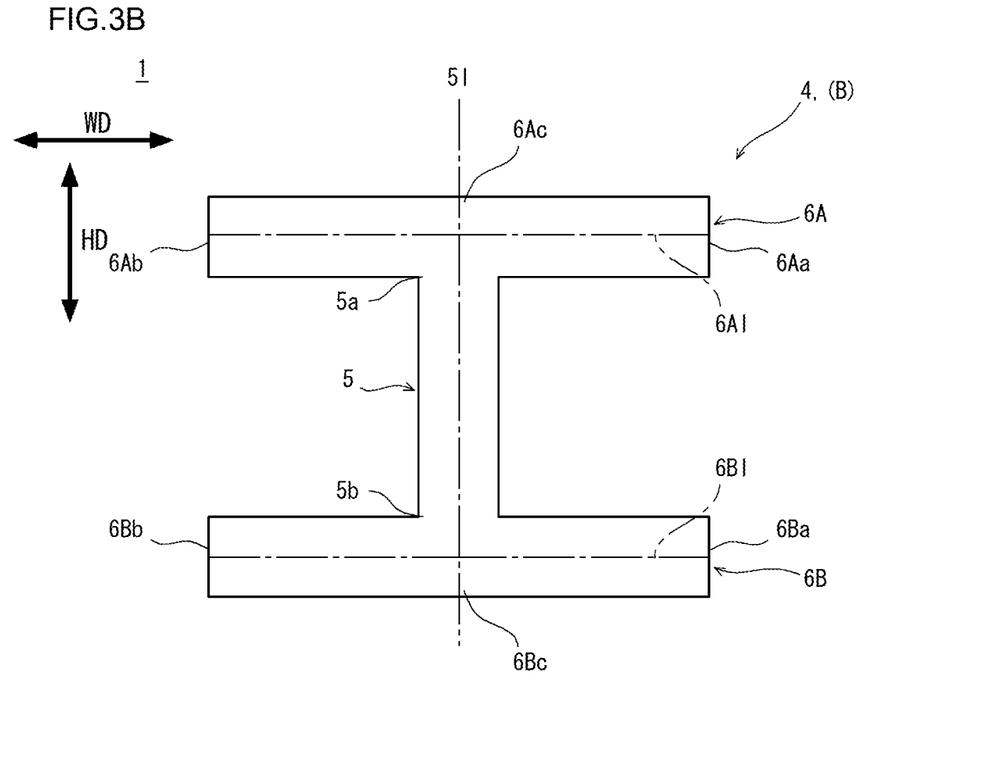
FIG. 3B is a transverse cross-sectional view schematically showing an example of the shape of a simplified arm.

FIG. 1 is a side view schematically showing an example of a support beam. FIG. 2 is a plan view schematically showing the example of the support beam. FIG. 3A and FIG. 3B are transverse cross-sectional views schematically showing an example of an arm of the support beam. An actual shape is shown in FIG. 3A, and a simplified shape is shown in FIG. 3B. In this specification, "a transverse cross section of the arm" means a cross section in the case where the arm is cut in a plane perpendicular to its longitudinal direction. The longitudinal direction of the arm generally coincides with a vehicle length direction FD in a state where the support beam is provided in a vehicle.

Referring to FIG. 1 and FIG. 2, a support beam 1 includes a first supporting portion 2, two second supporting portions 3, and two arms 4. Each of the arms 4 connects the first supporting portion 2 to the corresponding second supporting portion 3.

An axle cover 11 is fixed on the first supporting portion 2. The axle cover 11 supports an axle 10. In short, the first supporting portion 2 is a pedestal for supporting the axle 10. Air springs 13 are fixed on the second supporting portions 3. The air springs 13 are attached to a vehicle body 12. In short, the second supporting portions 3 are pedestals for supporting the vehicle body 12.

In FIG. 1 and FIG. 2, an example is shown in which the numbers of the second supporting portions 3 and the arms 4 are two. The two second supporting portions 3 are arranged in the vehicle length direction FD, so as to arrange the first supporting portion 2 between each other. In connection with this, each of the two arms 4 extends in the vehicle length direction FD from the first supporting portion 2. In short, the longitudinal direction of the arms 4 is substantially along the vehicle length direction FD. The arm 4 is curved along the longitudinal direction of the arm 4, so as to be convex downward in a vehicle height direction HD.

The support beam 1 is supported by the first supporting portion 2, and receives the weight of the vehicle body 12 by the two second supporting portions 3. Therefore, the load in the vehicle height direction HD (the up-and-down direction of the vehicle) is always applied on the support beam 1. Additionally, when the vehicle starts or stops, the load in the vehicle length direction FD is applied on the support beam 1. Further, when the vehicle runs on a curved road, the load in a vehicle width direction WD (the width direction of the vehicle) is applied on the support beam 1. Therefore, the bending load in the vehicle height direction HD is always applied on the arm 4 of the support beam 1. Further, the bending load in the vehicle width direction WD may be applied on the arm 4.

The transverse cross-sectional shapes of the arm 4 shown in FIG. 3A and FIG. 3B are basic shapes of the present consideration. Hereinafter, the arm 4 shown in FIG. 3A and FIG. 3B may be called the reference arm (B). The transverse cross-sectional shape of the reference arm (B) is a simple I shape.

Referring to FIG. 3A and FIG. 3B, the arm 4 includes a web 5, a first flange 6A, and a second flange 6B. The web 5 extends in the vehicle height direction HD in a transverse cross section of the arm 4. In short, the extending direction of the web 5 coincides with the vehicle height direction RD. The web 5 includes an upper end 5a and a lower end 5b. In the transverse cross section of the arm 4, the first flange 6A and the second flange 6B extend in the vehicle width direction WD. That is, the extending direction of each of the flanges 6A and 6B coincides with the vehicle width direction WD.

In the transverse cross section of the arm 4, the first flange 6A includes a first end 6Aa, a second end 6Ab, and a center portion 6Ac. The center portion 6Ac of the first flange 6A is connected to the upper end 5a of the web 5. Similar to this, the second flange 6B includes a first end 6Ba, a second end 6Bb, and a center portion 6Bc. The center portion 6Bc of the second flange 6B is connected to the lower end 5b of the web 5.

In the case of the reference arm (B), in the transverse cross section of the arm 4, a center line 6A1 of the thickness of the first flange 6A is a straight line. That is, the center line 6A1 is a straight line without bending over the entire area between the first end 6Aa and the second end 6Ab. Similar to this, a center line 6B1 of the thickness of the second flange 6B is a straight line. That is, the center line 6B1 is a straight line without bending over the entire area between the first end 6Ba and the second end 6Bb. Both the center line 6A1 and the center line 6B1 perpendicularly intersect with a center line 51 of the thickness of the web 5.

The support beam 1 is an integrally-molded part. This support beam 1 is produced by, for example, die forging. Therefore, as shown in FIG. 3A, a draft for removing from a die is actually provided in the first flange 6A and the second flange 6B. Accordingly, the first flange 6A is formed to be tapered toward each of the first end 6Aa and the second end 6Ab. Similar to this, the second flange 6B is formed to be tapered toward each of the first end 6Ba and the second end 6Bb. Further, the respective corner portions of the first ends 6Aa and 6Ba and the second ends 6Ab and 6Bb have rounded shapes. Additionally, the corner portions formed at the connection between the first flange 6A and the web 5, and the corner portions formed at the connection between the second flange 6B and the web 5 also have rounded shapes.

The support beam may be produced by welding thick plates. Specifically, the web and the flange may be welded and connected to each other. Additionally, the supporting portion and the arm may be welded and connected to each other. In this case, it is necessary to pay sufficient attention to corrosion and fatigue of the welded portions.

At the time of the rigid design of the arm 4, the draft of each of the flanges 6A and 6B can be omitted, and also the rounded shapes of the corner portions can be omitted. That is, as shown in FIG. 3B, the respective transverse cross-sectional shapes of each of the flanges 6A and 6B and the web 5 can be simplified into a shape (simple rectangle) in which straight lines are connected. Even when simplified in this manner, the rigidity of the arm 4 can be evaluated equivalently to the actual shapes.

Consideration of Support Beam of Present Embodiment

The support beam is required to have a high rigidity. Further, it is required to have a light weight and to be compact. The shape of the support beam that satisfies these conflicting requirements will be considered.

The transverse cross-sectional shape of the arm is based on a simple I shape as in the above-described reference arm (B). The rigidity is expressed by the area moment of inertia, which is a physical quantity. From a viewpoint of theory of strength of materials, in order to increase the rigidity against the bending load, the area moment of inertia about the central axis of the bending may be increased with respect to a transverse cross section of the arm.

In the support beam, when the arm has a simple I-shaped transverse cross section, in order to increase the rigidity against the bending load in the vehicle height direction, i.e., the rigidity in the extending direction of the web, it is effective to enlarge the length (height) of the web in a transverse cross-sectional view of the arm. It is because the area moment of inertia of the arm is proportional to the cube of the length of the web. However, when the length of the web is simply enlarged, the weight of the web is increased. Therefore, in this case, in order to suppress the weight increase of the web, it is necessary to reduce the plate thickness of the web.

However, when the length of the web is enlarged, and the plate thickness of the web is reduced, while the rigidity in the extending direction of the web (the vehicle height direction) is increased, the rigidity in the extending direction of the flange (the vehicle width direction) is decreased. Therefore, the rigidity against the bending load in the vehicle width direction is decreased. Hence, the ratio of the rigidity in the vehicle height direction to the rigidity in the vehicle width direction becomes high. That is, the discrepancy between the rigidity in the vehicle height direction and the rigidity in the vehicle width direction becomes large. In this case, there is a risk that the lateral buckling (torsional deformation) of the arm occurs.

The lateral buckling is a phenomenon in which the arm falls in a direction perpendicular to the load direction, and the arm is twisted. Although the lateral buckling occurs even when only the load in the vehicle height direction is applied, the lateral buckling occurs more easily when the load in the vehicle width direction is further applied. As a countermeasure, in order to increase the rigidity in the extending direction of the flange, it is conceivable to enlarge the length (width) of the flange in a transverse cross-sectional view of the arm.

However, there is not enough space in the extending direction of the flange, due to existence of periphery components (examples: the axle, the wheels, and the other components (a gear, a cover, and the like)). In short, the constraint that the external shape dimensions of the transverse cross section of the arm is to be made compact is imposed. Under this constraint, it is necessary to increase the rigidity in the extending direction of the web, and to increase the rigidity in the extending direction of the flange.

Based on the result of the above consideration, in order to increase the area moment of inertia in the transverse cross section of the arm of the support beam, a material may be arranged in a position distant from the central axis of the bending. The central axis of bending is a straight line that passes through the center of gravity of the transverse cross section of the arm.

Specifically, as for the area moment of inertia in the vehicle height direction (the extending direction of the web), the material may be arranged in a position distant from the central axis of the bending in the vehicle height direction. The central axis of the bending in this case is a straight line perpendicular to the center line of the thickness of the web in the transverse cross section of the arm, among the straight lines that pass through the center of gravity of the transverse cross section of the arm.

As for the area moment of inertia in the vehicle width direction (the extending direction of the flange), the material may be arranged in a position distant from the central axis of the bending in the vehicle width direction. The central axis of the bending in this case is the center line of the thickness of the web in the transverse cross section of the arm.

When the material is arranged in a position distant from the central axis of the bending, the area moment of inertia is increased, and accordingly, the rigidity is increased. This leads to the weight reduction, and also leads to compactness. In order to achieve these, it is appropriate that the flange includes a bent portion. This bent portion is a portion at which the center line of the thickness of the flange is bent outward in the extending direction of the web in the transverse cross section of the arm. Note that, in this specification, "outward" in the extending direction of the web means the direction away from the web in the extending direction of the web. The "inward" in the extending direction of the web means the direction to approach the web in the extending direction of the web.

Further, in order to further increase the rigidity in the vehicle width direction, it is preferable to arrange a thick-wall portion in a position distant from the central axis of the thickness of the web in the transverse cross section of the arm of the support beam. That is, in the flange, it is preferable that a thick-wall portion having a large thickness is arranged in a position on the end side of the flange, and a thin-wall portion having a small thickness is arranged in a position on the center portion side (web side) of the flange. In this case, the area moment of inertia in the vehicle width direction is further increased, and accordingly, the rigidity in the vehicle width direction is further increased.

Specifically, the flange including the bent portion includes the thin-wall portion. The thin-wall portion is arranged in, for example, the first central region located on the web side in the region between the first end and the center portion of the flange. The first central region is in the range of 50% of the distance from the center line of the thickness of the web to the first end. The thickness of the thin-wall portion in this case is smaller than the maximum thickness of the region located on the outer side of the first central region, i.e., the thickness of the thick-wall portion. Note that, in this specification, the region located on the outer side of the first central region means the region on the first end side of the region between the first end and the center portion.

Additionally, the thin-wall portion is arranged in, for example, the second central region located on the web side of the region between the second end and the center portion of the flange. The second central region is in the range of 50% of the distance from the center line of the thickness of the web to the second end. The thickness of the thin-wall portion in this case is smaller than the maximum thickness of the region located on the outer side of the second central region, i.e., the thickness of the thick-wall portion. Note that, in this specification, the region located on the outer side of the second central region means the region on the second end side of the region between the second end and the center portion.

Concrete Examples

Figure 4A:
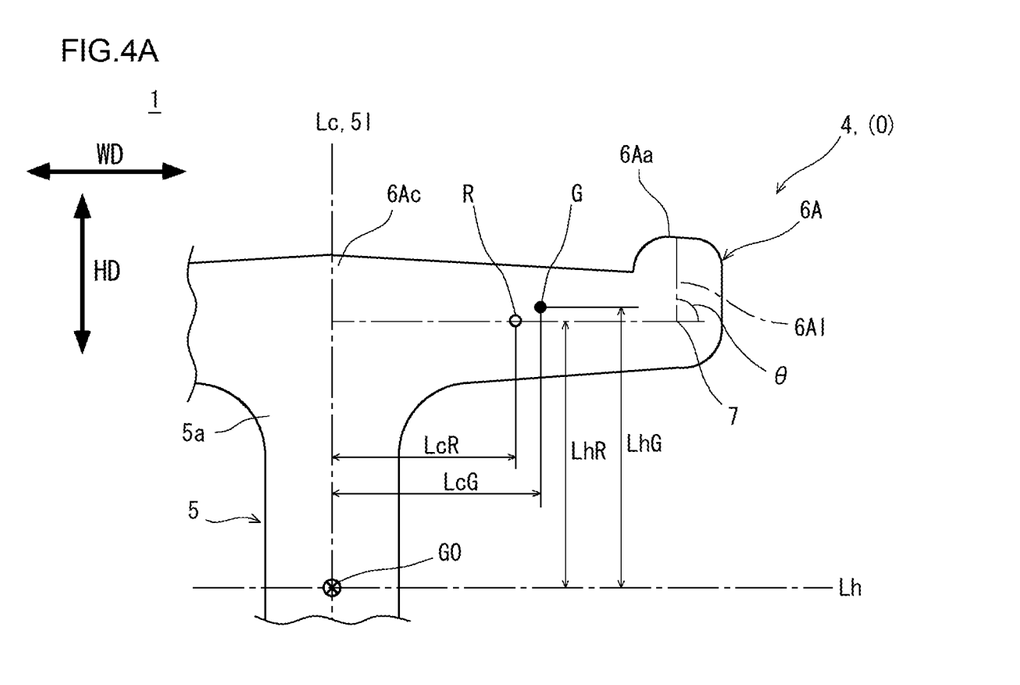
FIG. 4A is a transverse cross-sectional view schematically showing an example of an arm in a support beam of the present embodiment.
Figure 4B:
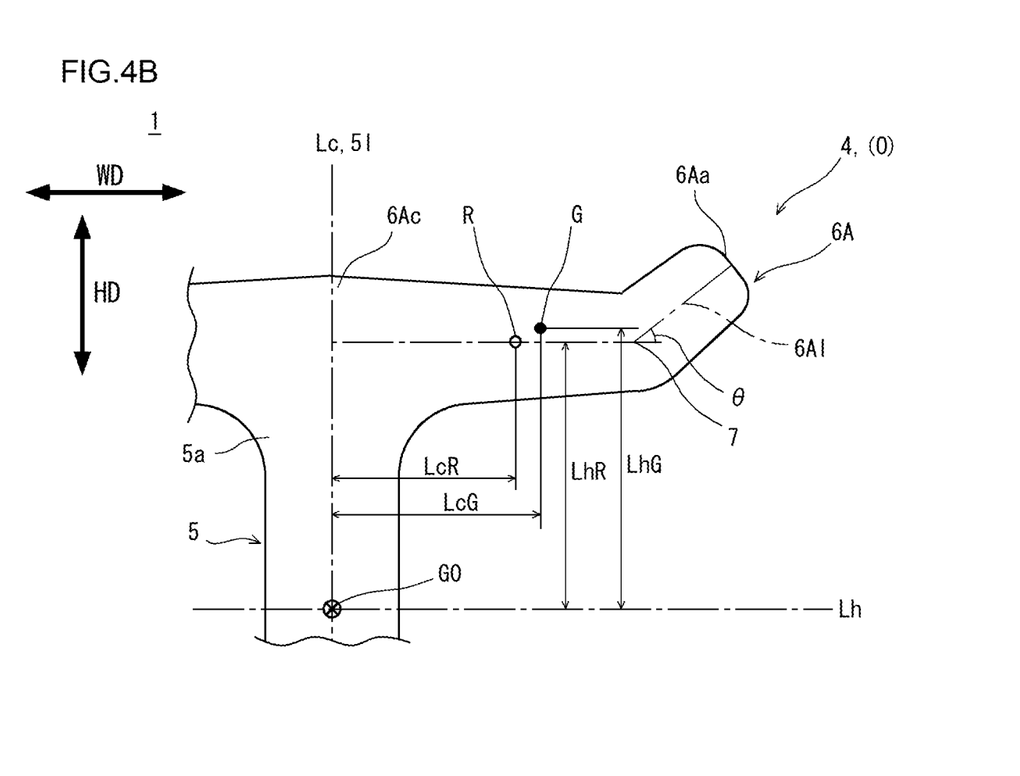
FIG. 4B is a transverse cross-sectional view schematically showing an example of an arm in the support beam of the present embodiment.
Figure 4C:
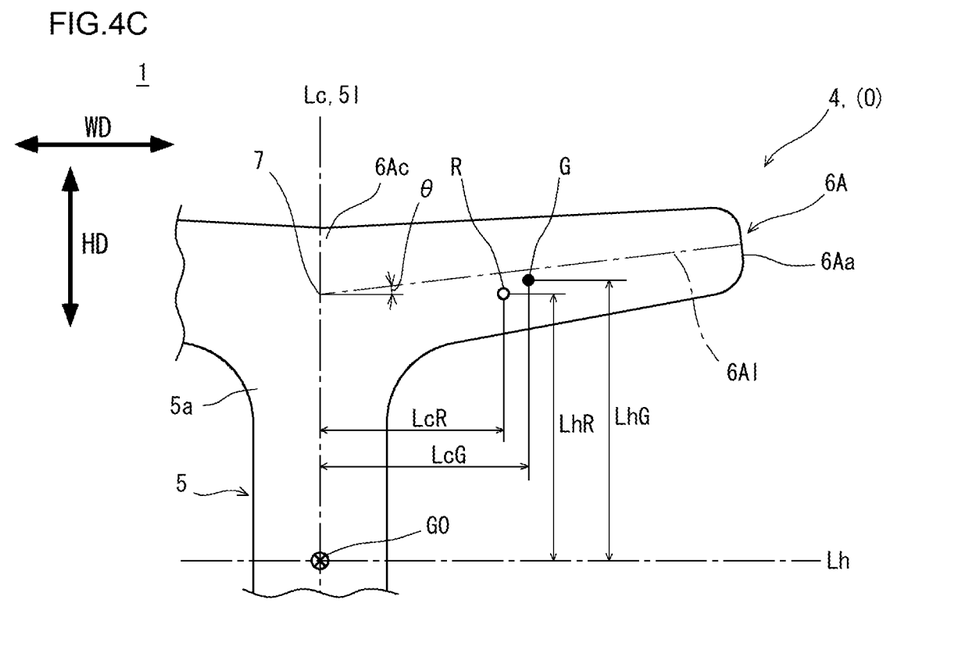
FIG. 4C is a transverse cross-sectional view schematically showing an example of an arm in the support beam of the present embodiment.

FIG. 4A to FIG. 4C are transverse cross-sectional views schematically showing an example of the arm in the support beam of the present embodiment. In these diagrams, the right half portion (the portion on the first end 6Aa side) of the first flange 6A connected to the upper end 5a of the web 5 of the two flanges 6A and 6B shown in the above-described FIG. 3A is representatively shown. Further, in FIG. 4A to FIG. 4C, a center of gravity GO of the transverse cross section of the arm 4, and a center of gravity G of the transverse cross section of the right half portion of the first flange 6A are shown. For comparison, a center of gravity R of the transverse cross section of the right half portion of the first flange 6A in the reference arm (B) is shown.

Referring to FIG. 4A to FIG. 4C, the flange 6A includes a bent portion 7 in the transverse cross section of the arm 4 in the arm (O) of the support beam 1 of the present embodiment. The bent portion 7 is a portion at which the center line 6A1 of the thickness of the flange 6A is bent outward in the extending direction of the web 5 (the vehicle height direction HD).

The bent portion 7 shown in FIG. 4A and FIG. 4B is provided in the vicinity of the first end 6Aa. The bent angle $\theta$ of the bent portion 7 shown in FIG. 4A is about 90°. The bent angle $\theta$ of the bent portion 7 shown in FIG. 4B is about 45°. The bent portion 7 shown in FIG. 4C is provided in the center portion 6Ac. The bent angle $\theta$ of this bent portion 7 is about 15°. The bent angle $\theta$ means the angle with respect to a straight line perpendicular to the center line 51 of the thickness of the web 5.

In any of the arms (O), a distance LhG from a central axis Lh of the bending in the vehicle height direction HD (the extending direction of the web 5) to the center of gravity G of the flange 6A is larger compared with a distance LhR from a central axis Lh to the center of gravity R in the reference arm (B). Additionally, a distance LcG from a central axis Lc of the bending in the vehicle width direction WD (the extending direction of the flange 6A) to the center of gravity G of the flange 6A is larger compared with a distance LcR from the central axis Lc to the center of gravity R in the reference arm (B).

In short, in any of the arms (O), the material is arranged in the position distant from both the central axis Lh of the bending in the vehicle height direction HD, and the central axis Lc of the bending in the vehicle width direction WD. Therefore, the rigidity of the arm (O) is increased both in the vehicle height direction HD and the vehicle width direction WD. In addition, as the result, the weight reduction can be realized. Further, the external shape dimensions of the transverse cross section of the arm (O) can be made compact.

Figure 5:
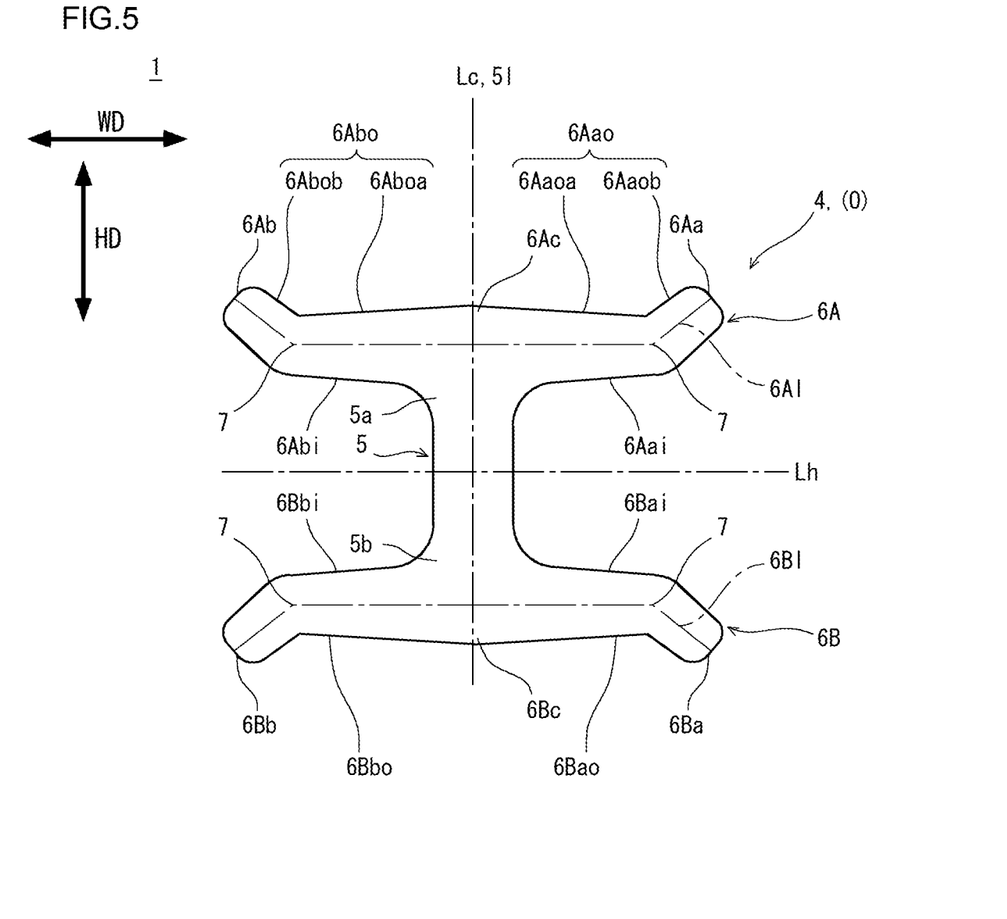
FIG. 5 is a transverse cross-sectional view schematically showing an example of an arm in the support beam of the present embodiment.

FIG. 5 is a transverse cross-sectional view schematically showing an example of the arm in the support beam of the present embodiment. In FIG. 5, an example in which the bent portions 7 shown in FIG. 4B are provided is shown. Referring to FIG. 5, the arm 4 (arm (O)) of the support beam 1 of the present embodiment includes the web 5, the first flange 6A, and the second flange 6B. That is, the flanges 6A and 6B are provided in the two ends 5a and 5b of the web 5, respectively.

Then, in the first flange 6A, the bent portion 7 is provided in each of the region between the first end 6Aa and the center portion 6Ac, and the region between the second end 6Ab and the center portion 6Ac. Further, in the second flange 6B, the bent portion 7 is provided in each of the region between the first end 6Ba and the center portion 6Bc, and the region between the second end 6Bb and the center portion 6Bc. That is, two bent portions 7 are provided in both the first flange 6A and the second flange 6B.

In the case of the arm 4 (arm (O)) shown in FIG. 5, in the first flange 6A, an outer surface 6Aao in the vehicle height direction HD (the extending direction of the web 5) of the surfaces of the region between the first end 6Aa and the center portion 6Ac is inclined toward the inner side in the vehicle height direction HD, and thereafter inclined toward the outer side in the vehicle height direction HD as farther away from the web 5. That is, the outer surface 6Aao includes a surface 6Aaoa inclined toward the inner side, and a surface 6Aaob inclined toward the outer side, in order of proximity to the web 5. The boundary between the surface 6Aaoa and the surface 6Aaob corresponds to the bent portion 7.

On the other hand, in the first flange 6A, similar to the outer surface 6Aao, an inner surface 6Aai in the vehicle height direction HD (the extending direction of the web 5) of the surfaces of the region between the first end 6Aa and the center portion 6Ac may be inclined toward the inner side in the vehicle height direction HD, and thereafter inclined toward the outer side in the vehicle height direction HD, as farther away from the web 5. Alternatively, as shown in FIG. 5, the inner surface 6Aai may be entirely inclined toward the outer side in the vehicle height direction HD. The inclination in this case may become greater as farther away from the web 5.

Additionally, in the first flange 6A, an outer surface 6Abo in the vehicle height direction HD (the extending direction of the web 5) of the surfaces of the region between the second end 6Ab and the center portion 6Ac is inclined toward the inner side in the vehicle height direction HD, and thereafter inclined toward the outer side in the vehicle height direction HD as farther away from the web 5. That is, the outer surface 6Abo includes a surface 6Aboa inclined toward the inner side, and a surface 6Abob inclined toward the outer side, in order of proximity to the web 5. The boundary between the surface 6Aboa and the surface 6Abob corresponds to the bent portion 7.

On the other hand, in the first flange 6A, similar to the outer surface 6Abo, an inner surface 6Abi in the vehicle height direction HD (the extending direction of the web 5) of the surfaces of the region between the second end 6Ab and the center portion 6Ac may be inclined toward the inner side in the vehicle height direction HD, and thereafter inclined toward the outer side in the vehicle height direction HD, as farther away from the web 5. Alternatively, as shown in FIG. 5, the inner surface 6Abi may be entirely inclined toward the outer side in the vehicle height direction HD. The inclination in this case may become greater as farther away from the web 5.

The same can also be said for the surfaces (outer surfaces 6Bao and 6Bbo, and inner surfaces 6Bai and 6Bbi) of the second flange 6B as for the surfaces (the outer surfaces 6Aao and 6Abo, and the inner surfaces 6Aai and 6Abi) of the first flange 6A.

Figure 6:
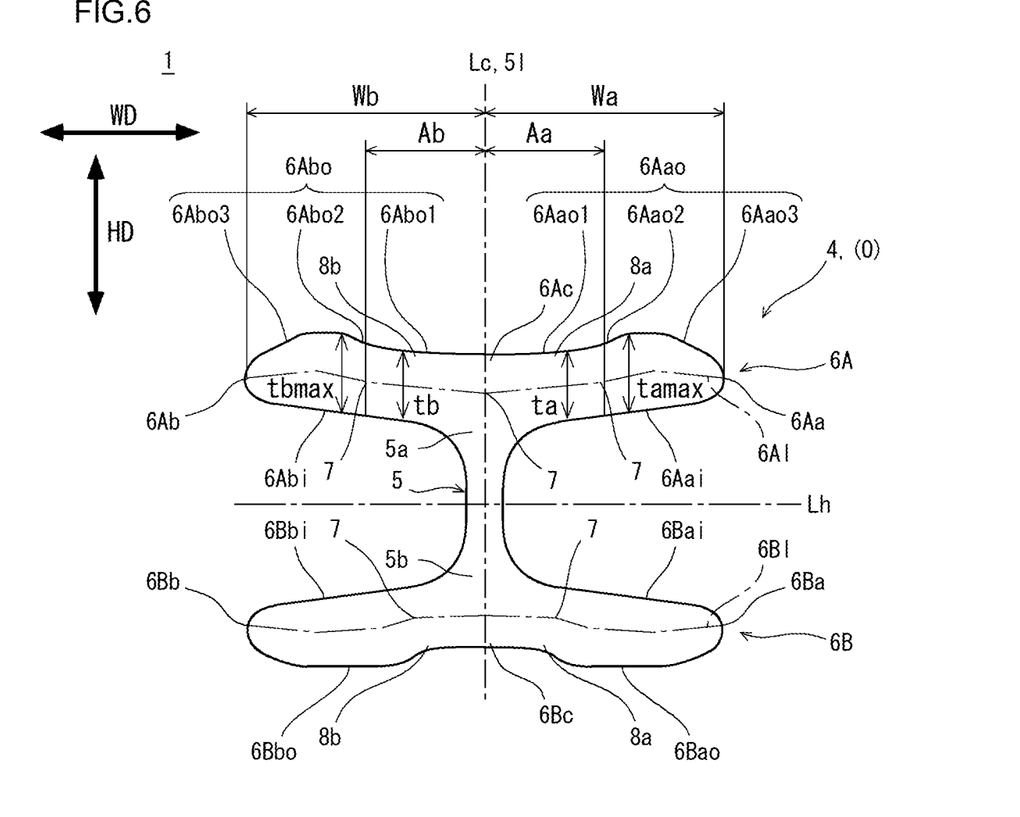
FIG. 6 is a transverse cross-sectional view schematically showing an example of an arm in the support beam of the present embodiment.

FIG. 6 is a transverse cross-sectional view schematically showing an example of the arm in the support beam of the present embodiment. Referring to FIG. 6, the arm 4 (arm (O)) of the support beam 1 of the present embodiment includes the web 5, the first flange 6A, and the second flange 6B. At least two bent portions 7 are provided in both the first flange 6A and the second flange 6B. In the first flange 6A, the bent portion 7 is also provided in the center portion 6Ac as in FIG. 4C.

The first flange 6A includes a thin-wall portion 8a having a small thickness in a first central region Aa. The first central region Aa is a region located on the web 5 side of the region between the first end 6Aa and the center portion 6Ac, and is in the range of 50% of a distance Wa from the center line 51 of the thickness of the web 5 to the first end 6Aa. A thickness ta of the thin-wall portion 8a is smaller than a maximum thickness tamax of the region located on the outer side of the first central region Aa. In this manner, in the first flange 6A, the thin-wall portion 8a is provided in the region (first central region Aa) between the first end 6Aa and the center portion 6Ac. The bent portion 7 exists in the first central region Aa.

The first flange 6A includes a thin-wall portion 8b having a small thickness in a second central region Ab. The second central region Ab is a region located on the web 5 side of the region between the second end 6Ab and the center portion 6Ac, and is in the range of 50% of a distance Wb from the center line 51 of the thickness of the web 5 to the second end 6Ab. A thickness tb of the thin-wall portion 8b is smaller than a maximum thickness tbmax of the region located on the outer side of the second central region Ab. In this manner, in the first flange 6A, the thin-wall portion 8b is provided in the region (second central region Ab) between the second end 6Ab and the center portion 6Ac. The bent portion 7 exists in the second central region Ab.

Such thin-wall portions 8a and 8b are also provided in the second flange 6B. In the first flange 6A, the bent portion 7 also exists in the boundary between the first central region Aa and the second central region Ab.

In this case, the thin-wall portions 8a and 8b are arranged in the positions on the center portion 6Ac side and the center portion 6Bc side (the web 5 sides) of the flanges 6A and 6B. In other words, the thick-wall portions are arranged in the positions on the end 6Aa side, the end 6Ab side, the end 6Ba side, and the end 6Bb side of the flanges 6A and 6B. That is, the thick-wall portions are arranged in the positions distant from the central axis Lc of the bending in the vehicle width direction WD. Therefore, the rigidity of the arm (O) in the vehicle width direction WD is further increased.

In the case of the arm 4 (arm (O)) shown in FIG. 6, in the first flange 6A, the outer surface 6Aao in the vehicle height direction HD (the extending direction of the web 5) of the surfaces of the region between the first end 6Aa and the center portion 6Ac is inclined toward the outer side in the vehicle height direction HD, and thereafter inclined toward the inner side in the vehicle height direction HD as farther away from the web 5. The inclination toward the outer side in the vehicle height direction HD is changed in the position of the bent portion 7. That is, the outer surface 6Aao includes a surface 6Aao1 inclined toward the outer side, a surface 6Aao2 further inclined toward the outer side, and a surface 6Aao3 inclined toward the inner side, in order of proximity to the web 5. On the first end 6Aa side of the first flange 6A, the boundary between the surface 6Aao1 and the surface 6Aao2 corresponds to the bent portion 7.

On the other hand, in the first flange 6A, the inner surface 6Aai in the vehicle height direction HD (the extending direction of the web 5) of the surfaces of the region between the first end 6Aa and the center portion 6Ac is entirely inclined toward the outer side in the vehicle height direction HD. However, the inclination of the inner surface Aai is not limited to the inclination shown in FIG. 6.

Additionally, in the first flange 6A, the outer surface 6Abo in the vehicle height direction HD (the extending direction of the web 5) of the surfaces of the region between the second end 6Ab and the center portion 6Ac is inclined toward the outer side in the vehicle height direction HD, and thereafter inclined toward the inner side in the vehicle height direction HD as farther away from the web 5. The inclination toward the outer side in the vehicle height direction HD is changed in the position of the bent portion 7. That is, the outer surface 6Abo includes a surface 6Abo 1 inclined toward the outer side, a surface 6Abo2 further inclined toward the outer side, and a surface 6Abo3 inclined toward the inner side, in order of proximity to the web 5. On the second end 6Ab side of the first flange 6A, the boundary between the surface 6Abo1 and the surface 6Abo2 corresponds to the bent portion 7.

On the other hand, in the first flange 6A, the inner surface 6Abi in the vehicle height direction HD (the extending direction of the web 5) of the surfaces of the region between the second end 6Ab and the center portion 6Ac is entirely inclined toward the outer side in the vehicle height direction HD. However, the inclination of the inner surface Abi is not limited to the inclination shown in FIG. 6.

The same can also be said for the surfaces (the outer surfaces 6Bao and 6Bbo, and the inner surfaces 6Bai and 6Bbi) of the second flange 6B as for the surfaces (the outer surfaces 6Aao and 6Abo, and the inner surfaces 6Aai and 6Abi) of the first flange 6A.

The support beam including the arm (O) of the present embodiment is an integrally-molded part. This support beam can be produced by die forging. However, since the flanges include the bent portions, it is difficult to form the support beam only by a usual die forging process. Here, when producing a die forging article as a hot processing, not only a die forging process and a trimming process, but also a coining process for dimensional correction is included in a series of processes. In this coining process, it is possible to form the bent portions by crushing or bending the flanges. It is also possible to add a separate process after the coining process, and to form the bent portions in that process. Therefore, the support beam of the present embodiment can be produced by utilizing die forging. Additionally, the support beam of the present embodiment can be produced by casting.

The support beam is not limited to an integrally-molded part. The support beam may be produced by welding thick plates. Specifically, the web and the flange may be welded and connected to each other. Additionally, the supporting portion and the arm may be welded to each other. In this case, it is necessary to pay sufficient attention to corrosion and fatigue of the welded portions. Between welding and die forging, the support beam can be produced more easily by welding. However, in terms of the performance of the support beam, the support beam that is an integrally-molded part is more excellent in terms of the corrosion and fatigue of the connected portion between the web and the flange. Therefore, the support beam that is the integrally-molded part by forging is most preferable.

Examples

The rigidity of the arm was studied by CAE analysis by changing the transverse cross-sectional shape of the arm in various ways. The evaluation of the rigidity of the arm was performed by comparing the area moment of inertias of the arms. This is because the larger the area moment of inertia is, the higher the rigidity.

Analysis Model of Comparative Example

Figure 7:
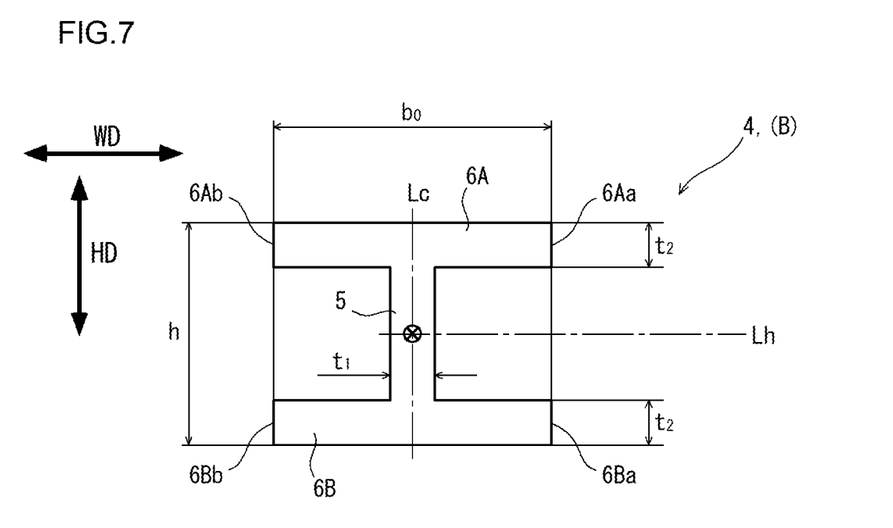
FIG. 7 is a schematic diagram showing the transverse cross-sectional shape of an arm of a model B, which is a comparative example.

FIG. 7 is a schematic diagram showing the transverse cross-sectional shape of an arm of a model B, which is a comparative example. The arm 4 of the model B shown in FIG. 7 corresponds to the reference arm (B) shown in the above-described FIG. 3A. That is, the arm 4 of the model B included the web 5 extending in the vehicle height direction HD, and the first flange 6A and the second flange 6B extending in the vehicle width direction WD.

The model B was based on a model B1 having the following dimensions.

$h=h_0=80$ mm, $b_0=80$ mm, $t_1=10$ mm, and $t_2=10$ mm

For the model B, the length (height) of the web 5 was changed in various ways to increase h. At that time, the cross-sectional area was maintained constant. That is, the weight was maintained constant. Therefore, a plate thickness $t_2$ of the flanges 6A and 6B was adjusted with the increase in h. Specifically, a ratio $\Delta h/h_0$ (hereinafter also referred to as "the height ratio") of an increase amount $\Delta h$ of h with respect to $h_0$ was changed to 0.5%, 1.0%, 5.0%, 10.0%, 20.0%, 30.0%, and 40.0%.

Analysis Model of Inventive Example of Present Invention

Figure 8:
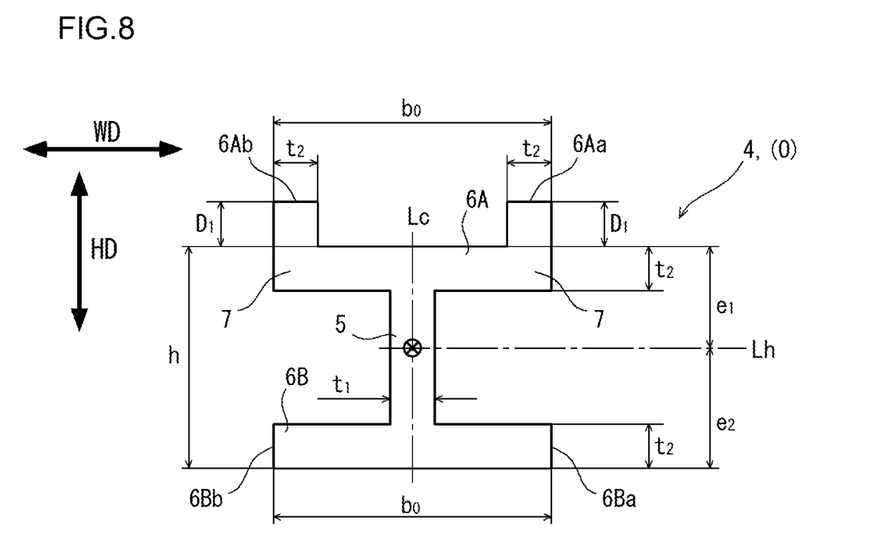
FIG. 8 is a schematic diagram showing the transverse cross-sectional shape of an arm of a model O, which is an inventive example of the present invention.

FIG. 8 is a schematic diagram showing the transverse cross-sectional shape of the arm of the model O, which is an inventive example of the present invention. The arm 4 of the model O shown in FIG. 8 corresponds to the arm (O) shown in the above-described FIG. 4A. That is, the model O included the web 5 extending in the vehicle height direction HD, and the first flange 6A and the second flange 6B extending in the vehicle width direction WD, and further included the bent portion 7 in the vicinity of each of the first end 6Aa and the second end 6Ab of the first flange 6A.

The model O was based on the above-described model B1.

For the model O, a projection length (bending height) $D_1$ in the vehicle height direction HD of the first and second ends 6Aa and 6Ab by the bent portions 7 was changed (increased) in various ways. At that time, the cross-sectional area was maintained constant. That is, the weight was maintained constant. Therefore, the plate thickness $t_2$ of the flanges 6A and 6B was adjusted with the increase in $D_1$. Specifically, a ratio $D_1/h_0$ (hereinafter also referred to as "the projection ratio") of $D_1$ with respect to $h_0$ was changed to 0.5%, 1.0%, 5.0%, 10.0%, 20.0%, 30.0%, and 40.0%.

Note that, in each of the models B in which the length (corresponding to h) of the web 5 was changed, and in each of the models O in which the projection length $D_1$ by the bent portion 7 was changed, the external shape dimensions (the maximum height in the extending direction of the web, the maximum width in the extending direction of the flange) of the cross-section were the same in the models having the same height ratio and projection ratio.

[Evaluation]

The area moment of inertia was calculated in each of the model B1, the models B in which the length (corresponding to h) of the web 5 was changed, and the models O in which the projection length $D_1$ by the bent portion 7 was changed. The theory of strength of materials was used for calculation of the area moment of inertia. Here, the area moment of inertia about the central axis Lh of the bending in the vehicle height direction HD, i.e., the area moment of inertia in the vehicle height direction HD, was calculated for each model. Further, the area moment of inertia about the central axis Lc of the bending in the vehicle width direction WD, i.e., the area moment of inertia in the vehicle width direction WD, was calculated.

Figure 9:
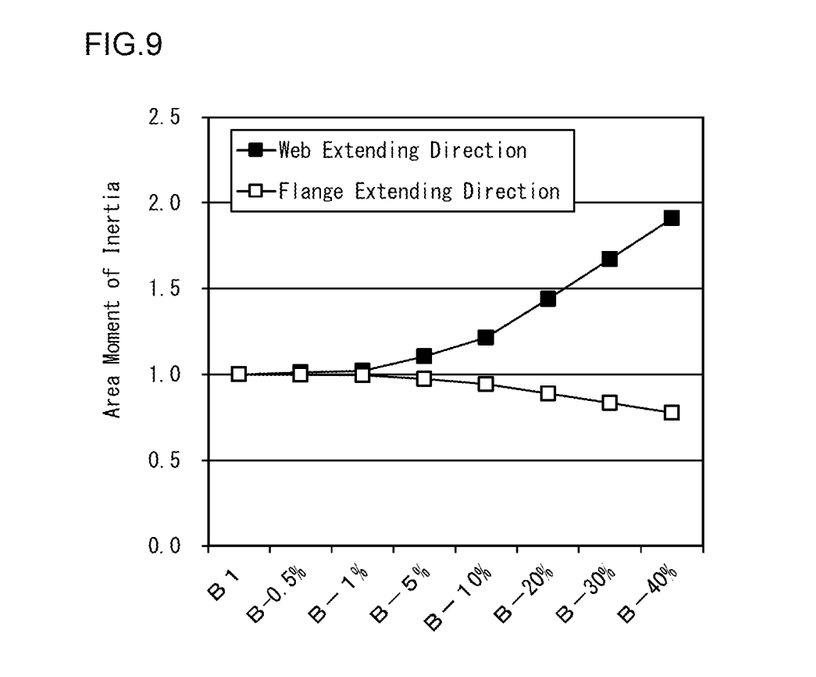
FIG. 9 is a diagram summarizing the area moment of inertia for the model B.
Figure 10:
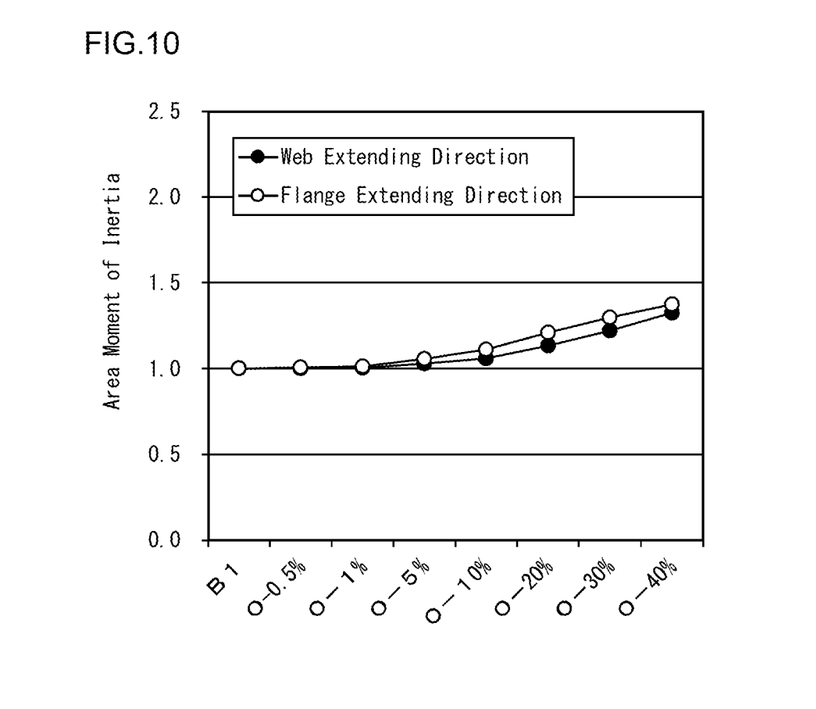
FIG. 10 is a diagram summarizing the area moment of inertia for the model O.

FIG. 9 is a diagram summarizing the area moment of inertia for the model B. FIG. 10 is a diagram summarizing the area moment of inertia for the model O. In FIG. 9 and FIG. 10, the area moment of inertia for each model is shown by the ratio using the value of the area moment of inertia of the model B1 as the reference "1.00".

Referring to FIG. 9, in the model B, which is the comparative example, although the area moment of inertia with respect to the bending in the extending direction of the web (the vehicle height direction HD) is increased with the increase in the length of the web, the area moment of inertia with respect to the bending in the extending direction of the flange (the vehicle width direction WD) is decreased. That is, the more the rigidity in the vehicle height direction is increased, the more the rigidity in the vehicle width direction is decreased.

In contrast, referring to FIG. 10, in the model O, which is the inventive example of the present invention, as the projection length by the bent portion is increased, both the area moment of inertia with respect to the bending in the extending direction of the web (the vehicle height direction HD), and the area moment of inertia with respect to the bending in the extending direction of the flange (the vehicle width direction WD) are increased. That is, the more the rigidity in the vehicle height direction is increased, the more the rigidity in the vehicle width direction is increased.

From the above, it can be said that, according to the support beam of the present embodiment, the rigidity of the arm is increased both in the vehicle height direction HD and the vehicle width direction WD. Additionally, in the model B, the ratio of the rigidity in the vehicle height direction with respect to the rigidity in the vehicle width direction becomes higher, as the rigidity in the vehicle height direction is increased. On the other hand, in the model O, even when the rigidity in the vehicle height direction is increased, the ratio of the rigidity in the vehicle height direction with respect to the rigidity in the vehicle width direction is hardly changed. Therefore, it can be said that the degree of safety with respect to lateral buckling is high in the model O.

In addition, it is needless to say that the present invention is not limited to the above-described embodiment, and various changes can be made within a scope that does not deviate from the spirit of the present invention.

INDUSTRIAL APPLICABILITY

The present invention can be effectively utilized for a support beam.

REFERENCE SIGNS LIST 1 support beam
2 the first supporting portion
3 the second supporting portion
4 arm
5 web
5a end
5b end
6A the first flange
6Aa the first end
6Ab the second end
6Ac center portion
6B the second flange
6Ba the first end
6Bb the second end
6Bc center portion
7 bent portion
FD vehicle length direction
HD vehicle height direction
WD vehicle width direction

The invention claimed is:

1. A support beam provided in a vehicle comprising:
   a first supporting portion, a second supporting portion, and an arm connecting the first supporting portion to the second supporting portion,
   the arm including a web and a flange,
   the flange including a first end, a second end, and a center portion connected to an end of the web,
   the flange including a bent portion at which a center line of a thickness of the flange is bent outward in an extending direction of the web in a region between the first end and the second end in a transverse cross section of the arm,
   wherein the center line of a thickness of the flange is bent outward in an extending direction of the web from the bent portion to the first end, and
   the first end is located outward of the center portion in the extending direction of the web.

2. The support beam according to claim 1, wherein the flange further includes a first thin-wall portion,
   the first thin-wall portion and the bent portion are arranged in a first central region located on the web side of a region between the first end and the center portion in the transverse cross section of the arm, and
   the first central region is in a range of 50% of a distance from a center line of a thickness of the web to the first end, and a thickness of the first thin-wall portion is smaller than a maximum thickness of a region located on an outer side of the first central region.

3. The support beam according to claim 2,
   wherein the flange further includes a second thin-wall portion,
   the second thin-wall portion and the bent portion are arranged in a second central region located on the web side of a region between the second end and the center portion in the transverse cross section of the arm, and
   the second central region is in a range of 50% of a distance from the center line of the thickness of the web to the second end, and a thickness of the second thin-wall portion is smaller than a maximum thickness of a region located on an outer side of the second central region.

4. The support beam according to claim 3,
   wherein, in the flange, an outer surface in the extending direction of the web of surfaces of the region between the second end and the center portion is inclined toward an outer side in the extending direction of the web, and thereafter inclined toward an inner side in the extending direction of the web as farther away from the web.

5. The support beam according to claim 2,
   wherein, in the flange, an outer surface in the extending direction of the web of surfaces of the region between the first end and the center portion is inclined toward an outer side in the extending direction of the web, and thereafter inclined toward an inner side in the extending direction of the web as farther away from the web.

6. The support beam according to claim 1,
wherein the bent portion is provided in a region between the first end and the center portion, and
in the flange, an outer surface in the extending direction of the web of surfaces of the region between the first end and the center portion is inclined toward an inner side in the extending direction of the web, and thereafter inclined toward an outer side in the extending direction of the web as farther away from the web.

7. The support beam according to claim 6,
wherein the bent portion is further provided in a region between the second end and the center portion, and
in the flange, an outer surface in the extending direction of the web of surfaces of the region between the second end and the center portion is inclined toward the inner side in the extending direction of the web, and thereafter inclined toward the outer side in the extending direction of the web as farther away from the web.

\* \* \* \* \*